Patented Oct. 30, 1951

2,573,265

UNITED STATES PATENT OFFICE 2,573,265

ISOLATION OF STEROLS

Willy Lange, Cincinnati, and Robert G. Folzenlogen, Golf Manor, Ohio, assignors to The Procter & Gamble Company, Cincinnati, Ohio, a corporation of Ohio No Drawing. Application June 25, 1948, Serial No. 35,283

11 Claims. (Cl. 260—397.2)

This invention relates to the treatment of sterol-containing materials, and more particularly to the recovery of typical sterols containing the 3(beta)-hydroxy-5:6-ene grouping from materials such as wool fat, fish liver oils, soybean oil, cottonseed oil, tallow, other vegetable and animal oils and fats, gallstones, nerve tissue, and other sterol-containing substances.

An object of the present invention is to provide a process for the recovery of typical sterols containing the 3(beta)-hydroxy-5:6-ene grouping from sterol-containing substances.

A further object is to provide a process for the separation of sterols containing the 3(beta)-hydroxy-5:6-ene bond grouping from derivatives thereof, such as oxidation and reduction products, which do not contain both the 3(beta)-hydroxy group and the 5:6 double bond.

Another object is to provide a rapid and continuous process for the precipitation of sterols of particular concern herein from solutions of same in oxygen-free solvents.

Methods for the recovery of sterols have been proposed heretofore, but as far as we are aware there is no method which permits the precipitation of sterols in an inexpensive and rapid operation especially adapted for use on a commercial scale. For example, digitonin, which is used in sterol laboratories to precipitate sterols, is very expensive and is therefore used only for the separation of small quantities of materials. Since digitonin precipitates not only the sterols themselves, but also many types of sterol derivatives, subsequent fractionation and separation of the recovered precipitated material may be necessary if pure sterols are desired.

A method for the isolation of cholesterol has been proposed by Natelsohn et al. in U. S. Patent 2,220,114. The method is based on the formation of true esters of cholesterol with polybasic acids such as sulfuric, phosphoric and boric acids, followed by the formation of alkali metal salts of these acid esters. Impurities are then removed by washing the salts with solvents, following which the esters are hydrolyzed. The disadvantage of the method is that compounds other than sterols containing alcoholic hydroxyl groups and which may be esterified by the acid are recovered with the sterols.

Another method is that developed by Yoder, covered by U. S. Patent 2,322,906. This process involves the separation of sterols from the unsaponifiable fraction recovered from wool grease. The unsaponifiable material is dissolved in a non-alcoholic solvent and sterols are precipitated with anhydrous hydrogen chloride or bromide at temperatures between 5° and 20° C. The process requires considerable time and exposes the sterol to the action of strong acid for extended periods with ensuing dehydroxylation and consequent reduction in sterol yield.

In another patent, U. S. 2,362,605, Yoder describes the precipitation of sterols from an oxygen-free solvent with anhydrous oxalic acid. The method requires considerable time and is tedious.

In accordance with the present invention, typical sterols such as cholesterol, phytosterol, stigmasterol, beta-sitosterol, ergosterol and also 7-dehydrocholesterol, all of which possess the 3-(beta)-hydroxy-5:6-ene grouping, are precipitated rapidly and completely with perchloric acid, $HClO_4$, or hexafluorophosphoric acid, $HPF_6$, from suitable solutions as well-formed, white crystals, which are believed to be sterol-acid addition products and from which the sterol may be subsequently recovered substantially quantitatively and unchanged by decomposition of the acid addition products with water or aqueous solutions.

More specifically, the method involves treatment of the sterol-containing substance to provide a solution of the sterol and other unsaponifiable substances in an oxygen-free hydrocarbon or halogenated hydrocarbon solvent, as fully described below, then intimately mixing the solvent solution with an aqueous solution of perchloric or hexafluorophosphoric acid of a concentration from about 55 per cent to about 85 per cent, preferably in limited excess, to precipitate the true sterol substantially completely. The precipitated crystals of the sterol-acid addition product, which form almost instantaneously and from which the sterol may be recovered with unchanged structure, are thereafter promptly separated by filtration, centrifugation, or otherwise from the mother liquor containing soluble sterol derivatives in solution. The crystalline residue is thereafter treated with water or an aqueous alkaline solution, preferably in the presence of a water-insoluble solvent for the sterol. This treatment effects hydrolysis of the sterol-acid addition product, the liberated sterols being dissolved by the solvent. The resulting solvent solution is preferably washed with water until the wash water is neutral, and the sterols are recovered by evaporation of the solvent.

If recovery of the soluble sterol derivatives is desired, the mother liquor resulting from the above separation is also washed with water or aqueous alkaline solutions or both until neutral.

Since a number of sterol derivatives decompose with rapidity in the presence of excess strong acid it is preferable to effect washing or neutralization promptly after separation from the crystalline product. It is customary, for example, to discharge the filtrate directly into water or an aqueous alkaline solution. The liberated sterol derivatives, in solvent solution, are separated from the aqueous phase and upon evaporation of the solvent, sterol derivatives are concentrated in the residue.

Sterols which may be recovered in accordance with the present invention have the basic ring structure of the cyclopentano-perhydrophenanthrenes modified as follows:

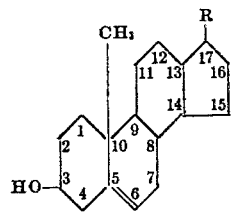

where R is

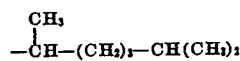

or

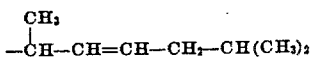

or substitution products thereof.

These sterols, it will be noted, are characterized by the presence of a 3(beta)-hydroxy group and a 5:6-ene bond. They may contain an additional double bond in the ring system, for example in the 7:8 position. Our work has indicated that when the 3(beta)-hydroxy group and the 5:6 double bond are both free and unblocked in the sterol molecules, then the acid addition products thereof, as formed in our invention, are insoluble in the oxygen-free solvent, and separation of the sterol from those derivatives in which either the hydroxy group or the double bond has been modified can be effected by the process of this invention.

It is to be borne in mind that hydrogenation of sterol-containing substances may effect conversion of the sterols to dihydrosterols in which the 5:6 double bonds do not exist and which do not precipitate from solution on reaction with the acid. On the other hand, ergosterol and its closely related derivative, 7-dehydrocholesterol, which compounds possess not only the above essential 3(beta)-hydroxy group and 5:6-ene bond but also an additional double bond in the 7:8 position, are precipitated as white acid addition products by the acids herein used. The presence of such second double bonds in the basic ring system, however, while not affecting the ability of the compound to form crystallized precipitates with the acid, renders the compound especially sensitive toward excess acid and care must be taken in acid treatment of such materials to avoid substantial excesses of acid and high temperature of treatment whereby the sterol may be decomposed.

The outstanding advantages of the present invention are that the precipitation of the typical sterols as crystallized sterol-acid addition products takes place substantially instantaneously on addition of the acid and that this precipitability is a specific characteristic not shown by those sterol derivatives which do not contain both the 3(beta)-hydroxy group and the 5:6 double bond, thereby permitting ready and rapid separation of typical sterols from said derivatives, an operation of commercial value in the manufacture of hormones and vitamins. The acid treatment and separation of crystallized acid addition product may be performed in a few minutes and complete separation and recovery of the sterols involving hydrolysis of the crystallized material may be performed in a relatively short time, not longer than a few hours, as compared with the heretofore customary lengthy period involving elaborate work. Such permissible shorter times of contact with excess concentrated acid are especially advantageous in the event recovery of the sterol derivatives from the mother liquor is desired because such derivatives have been found to decompose with rapidity in the presence of excess acid. However, it is to be noted that advantages are also realized with respect to the sterols themselves. These materials lose their hydroxy groups and thus lose their sterol character in the presence of excess concentrated acid, albeit at a somewhat lower rate than their acid-sensitive derivatives. Consequently any existing tendencies toward decomposition are held to a minimum with resulting increase in yield of valuable product.

Minimization of the tendency of sterols and sterol derivatives to decompose in the presence of excess precipitating acid is also aided by avoiding treatment temperatures substantially in excess of 100° F. Ordinary room temperatures from 70° to 85° F. are of course preferred and lower temperatures effected by refrigeration may be employed if desired, provided unsaponifiable materials remain in solution in the solvent at such lower temperatures.

In the recovery of sterol-like compounds wherein the 3-hydroxy group has been esterified, as in wool grease for example, preliminary hydrolysis of this ester group as by saponification with sodium or potassium hydroxide is necessary prior to treatment with the precipitating acid, otherwise the sterol is not precipitated. The liberated sterols and other unsaponifiable constituents of the saponified mixture may be separated from the soap by solvent extraction with the solvent in accordance with known procedures. The solvent extract, preferably after suitable concentration, may then be subjected to treatment with the acid to precipitate the sterols.

It is to be observed also, for example, that the concentration of sterols in naturally occurring substances, such as vegetable oils, is relatively low, normally from 0.05 per cent to 0.1 per cent, and that at such low concentration and in the presence of oxygen-containing substances (glycerides or other esters) it is impractical to precipitate the sterols by the direct addition of perchloric or hexafluorophosphoric acid even though the hydroxy group and double bond of the sterol may be unchanged. Accordingly in working with such sterol-containing substances it is essential to extract the unsaponifiable material (which includes the sterols) with a suitable solvent and then effect precipitation of the sterols.

Similarly, in the treatment of sterol-rich materials such as nerve tissue in accordance with our invention, the sterols, along with other unsaponifiable materials, are first extracted with the solvent to provide a suitable solution from which the sterols may be subsequently precipitated by the addition of the perchloric or hexafluorophosphoric acid.

The solvents which may be employed as media for the precipitation reaction are those normally liquid, oxygen-free hydrocarbons and halogenated hydrocarbons in which a halogen such as chlorine or bromine has been substituted for hydrogen atoms in the molecule. Examples of such solvents are petroleum ether, hexane, heptane, chloroform, bromoform, carbon tetrachloride, chloroethylene, dichloroethylene, trichloroethylene, trichloropropane, 1,4 dichlorobutane, benzene, toluene, monochlorobenzene, and the like. Saturated hydrocarbon solvents and their derivatives are particularly suitable for use. It is especially desirable that the solvents be free from oxygen-containing solvents such as ethanol and acetone because such materials are excellent solvents for the sterol-acid addition products and tend to interfere with precipitation.

The amount of solvent relative to the sterol content of the mixture is not critical, but it is preferable that the sterol concentration be not too low, that is, not less than about 2 per cent. A concentration from about 5 per cent to about 20 per cent sterol in solvent is preferred. Large excesses of solvent of course reduce the concentration of the sterols and tend to lower the percentage yield obtained in precipitation.

The concentration of the acid employed is not critical. However, concentrations from 55 per cent to 85 per cent are preferably used. In general, more complete precipitation is effected by the use of higher concentrations, but the destruction of the sterol and especially the sterol derivatives is more rapid under such conditions especially since excesses are preferably used for maximum yield. It follows, therefore, that the importance of holding contact times to a minimum is greater with use of the more concentrated acids. We have found that precipitation of the sterols proceeds most satisfactorily when the concentration of the acid employed is about 70 per cent.

The amount of acid (figured as anhydrous) desirable for use in effecting precipitation is likewise not critical, but we have observed that the amount required for optimum precipitation increases with decrease in the concentration of the sterol in the solvent. Although the product precipitated is believed to be the result of the combination of one mol of acid with one mol of sterol, somewhat greater than the theoretical amount of acid is preferably employed in order to realize optimum yield even when concentrations of the sterol in the solvent are high. If, for example, the concentration of the sterol in the solvent is around 10 per cent, about 1½ mols of acid is used to obtain substantially complete precipitation. A sterol concentration of about 5 per cent in the solvent, on the other hand, requires about 2 mols of acid per mol of sterol. In some circumstances as much as 3 mols of acid per mol of sterol may be required, but larger amounts are not recommended because of the increased tendency of the excess acid to destroy the sterol and especially the sterol derivatives.

Although either perchloric or hexafluorophosphoric acid serves adequately in the practice of the invention, hexafluorophosphoric acid, $HPF_6$, has an advantage in that the dry sterol-acid addition products thereof are exceptionally stable and do not burn when heated as do the corresponding addition products formed from perchloric acid, $HClO_4$. Furthermore, hexafluorophosphoric acid is a weaker acid than perchloric acid and therefore has less destructive action on the sterols and sterol derivatives when used in excess. This is especially noticeable in the case of ergosterol which is very sensitive toward strong acids.

Hexafluorophosphoric acid, however, has one disadvantage in that it is capable of forming a crystalline hydrate which may precipitate along with the sterol-acid addition product. If, for example, just enough hexafluorophosphoric acid is removed from the acid phase of the mixture by combination with sterol to reduce the concentration of the acid to the range of about 50–55 per cent, hydrate crystals of the acid form and precipitate with the crystals of the sterol-acid addition product. Therefore, in the use of hexafluorophosphoric acid it is preferable to adjust the amount and/or concentration of the acid so that the concentration of the residual acid after combination with the sterol substance is below the range of substantially 50 to 55 per cent.

The instantaneous completeness with which the typical sterols may be precipitated in accordance with the present invention renders the precipitation process well adapted for continuous operation wherein continuously flowing, proportioned streams of the sterol-containing solvent solution and acid are intimately contacted in a suitable mechanical mixer to effect precipitation of the sterol-acid addition product which is then separated from the mother liquor by centrifugal separation. Neutralization of the sterol-containing precipitate and the sterol-derivative-containing mother liquor with recovery or concentration of the separated constituents may then be effected as described above.

The sterol-acid addition products are relatively stable in the absence of excess concentrated acid and may be recovered as an excess-acid-free, dry crystalline material by careful separation of the solvent from the crystals during filtration or centrifugation. Care should be taken to avoid the presence of water, even that contained in moist air, thereby avoiding hydrolysis of the sterol-acid addition products. The dry crystals may thereafter be stored if desired, preferably under substantially anhydrous conditions in acid resistant containers.

The following examples will illustrate in detail the manner in which the invention may be practiced. It will be understood, however, that the invention is not confined to the specific limits covered therein but rather to the scope of the appended claims.

*Example 1.*—A solution of 10 grams of cholesterol in 100 c. c. of chloroform was vigorously agitated at 75°–85° F. with about 5.44 grams of 70% perchloric acid (about 1½ mols $HClO_4$ per mol of cholesterol). Crystallization was noted immediately. The mixture was stored at 75°–80° F. for about 1 minute, then filtered through an acid resistant filter with the aid of suction. Care was taken to avoid sucking moist air through the cake of crystals for an appreciable length of time since absorption of moisture from the air would cause partial hydrolysis of the cholesterol-acid addition product. The theoretical acid content for cholesterol·$HClO_4$ is 20.64% $HClO_4$. In the present instance the crystals precipitated and recovered contained 20.81% $HClO_4$. Upon treatment of the crystals with an aqueous solution of sodium hydroxide the cholesterol was liberated and thereafter extracted from the aqueous phase with chloroform. Evaporation of the chloroform from the extract produced a residue of substantially pure cholesterol in substantially theoretical amount.

As an auxiliary example, hexane is substituted for chloroform as the solvent.

*Example 2.*—A solution of 5 grams cholesterol in 100 c. c. chloroform was treated as in Example 1 with 4.32 grams of 70% perchloric acid (about 2.3 mols HClO4 per mol of cholesterol). The recovered crystals were treated with an aqueous sodium hydroxide solution, the cholesterol being liberated in substantially theoretical amount.

*Example 3.*—A solution of 10 grams phytosterols (a mixture of various sterols) in 100 c. c. chloroform was treated as in Example 1 with 6.1 grams of 70% perchloric acid (about 1.6 mols HClO4 per mol of phytosterol). The recovered crystals contained 23.21% HClO4. The phytosterols were liberated on treatment of the crystals with an aqueous sodium hydroxide solution and separation thereof from the aqueous phase was effected with the aid of chloroform as a solvent.

*Example 4.*—A solution of approximately 1.0 gram of ergosterol in 35 c. c. of chloroform was thoroughly mixed at 75°–80° F. with .39 gram of 70% perchloric acid per one gram of ergosterol. Instantaneously a white crystalline precipitate formed. This crystalline material was separated by suction filtration and stored under moisture-free conditions and 89.9% of theoretical yield was obtained. The crystals contained 20.20% HClO4 whereas the theoretical acid content of ergosterol · HClO4 is 20.22%. The ergosterol was liberated from the crystalline material by treatment with an aqueous sodium hydroxide solution and thereafter extracted with chloroform.

*Example 5.*—In the steam deodorization of fats and fatty oils a fat-like material is frequently distilled off. This material is sometimes referred to in the industry as "clabber stock." Such materials contain sterol and sterol derivatives which may be recovered by means of the present invention. 100 grams of clabber stock were treated with caustic soda solution to saponify the saponifiable material contained therein. From the mixture produced, 20.1 grams of unsaponifiable material were extracted with the use of hexane. The recovered hexane solution was evaporated and the residue was blown with steam under vacuum to remove volatile components. This residue was cooled to 75°–80° F. and diluted with chloroform to 100 c. c. and 3.5 grams of 70% perchloric acid were added. The mixture was vigorously agitated. Crystallization of the sterols was instantaneous and the crystallized material was recovered by suction filtration. A yield of 3.2 grams of crystalline material was obtained corresponding to about 2.5% sterol in the original clabber stock.

Since the original unsaponifiable material contained oxidation and hydrogenation products of sterols, these materials did not precipitate on treatment with perchloric acid but were concentrated in the mother liquor. Upon neutralization of the mother liquor and evaporation of the solvent, the sterol derivatives were recovered in the residue substantially free from sterols.

*Example 6.*—A solution of 1 gram cholesterol in 10 c. c. chloroform was vigorously agitated at ordinary room temperature with 0.58 gram of 65.2% hexafluorophosphoric acid (about 1 mol HPF6 per mol of cholesterol). A mass of white crystals formed immediately and was separated from the mother liquor as in Example 1. The recovered crystals analyzed as 26.98% HPF6 as compared with a calculated content of 27.43% for the mol·mol addition product. The cholesterol liberated on treatment with lye solution was recovered by extraction with chloroform.

Having thus described our invention, what we claim and desire to secure by Letters Patent is:

1. A process for the separation of sterol containing a hydroxy group in 3(beta)-position and a double bond in 5:6-position from sterol-containing material, which comprises providing a solution of the unsaponifiable fraction of said material in an oxygen-free, liquid solvent of the group consisting of hydrocarbons and halogenated derivatives thereof, mixing therewith at a temperature not substantially in excess of 100° F. an acid of the group consisting of perchloric and hexafluorophosphoric acids thereby effecting precipitation of sterol constituents of the unsaponifiable fraction without effecting precipitation of sterol derivatives, and separating the precipitate from the mother liquor.

2. Process of claim 1 in which the concentration of sterol in solvent is at least 2 per cent.

3. Process of claim 1 in which the acid concentration is not less than 55 per cent and not higher than 85 per cent.

4. Process of claim 3 in which the amount of acid on an anhydrous basis does not substantially exceed 3 mols of acid per mol of sterol.

5. Process of claim 4 in which the acid is perchloric acid and in which the amount of an anhydrous basis does not substantially exceed 3 mols of acid per mol of sterol.

6. Process of claim 4 in which the acid is hexafluorophosphoric acid and in which the amount on an anhydrous basis does not substantially exceed 3 mols of acid per mol of sterol and gives a residual hexafluorophosphoric acid concentration below 50% in the mother liquor after combination with sterol.

7. Process for the separation of sterol containing a 3-hydroxy group and a 5:6 double bond from sterol-containing material, which comprises providing a solution of the unsaponifiable fraction of said material in an oxygen-free, liquid solvent of the group consisting of hydrocarbons and halogenated derivatives thereof, mixing therewith at a temperature not substantially in excess of 100° F. an acid of the group consisting of perchloric and hexafluorophosphoric acid in which the acid concentration is not less than 55 per cent and not higher than 85 per cent thereby effecting precipitation of sterol constituents of the unsaponifiable fraction without effecting precipitation of sterol derivatives, separating the precipitate from the mother liquor, hydrolyzing the precipitate and recovering the liberated sterol.

8. Process of claim 7 in which the concentration of sterol in solvent is at least 2 per cent.

9. Process of claim 7, in which the hydrolysis is effected by treatment with an aqueous alkaline solution.

10. Process of claim 9, in which the treatment is effected in the presence of a sterol solvent insoluble in water.

11. Process of separating sterol containing a 3-hydroxy group with a 5:6 double bond from derivatives not containing both the 3-hydroxy group and the 5:6 double bond, which comprises providing a solution of a mixture of sterol and sterol derivative in an oxygen-free, liquid solvent of the group consisting of hydrocarbons and halogenated derivatives thereof, mixing with the solution at a temperature not substantially in excess of 100° F. an acid of the group consisting of perchloric and hexafluorophosphoric acids in which the acid concentration is not less than 55 per cent and not higher than 85 per cent thereby effecting precipitation of sterol without effecting precipitation of derivatives thereof, promptly separating the precipitate from the mother liquor, treating the precipitate with an aqueous alkaline solution thereby liberating sterol, recovering liberated sterol, neutralizing the mother liquor with an aqueous alkaline solution, separating the aqueous phase from the solvent solution, and evaporating the solvent thereby obtaining a residue containing the sterol derivatives.

WILLY LANGE.
ROBERT G. FOLZENLOGEN.

REFERENCES CITED

The following references are of record in the file of this patent:

UNITED STATES PATENTS

| Number    | Name     | Date          |
|-----------|----------|---------------|
| 2,220,114 | Natelson | Nov. 5, 1940  |
| 2,322,906 | Yoder    | June 29, 1943 |
| 2,362,605 | Yoder    | Nov. 14, 1944 |

OTHER REFERENCES

Hoffmann, Berichte 43, pp. 1080–1086 (1910).